United States Patent [19]
Logan

[11] Patent Number: 5,879,045
[45] Date of Patent: Mar. 9, 1999

[54] VEHICLE BODY AND FENDER EXTENSION SYSTEM

[75] Inventor: Gerald A. Logan, Portland, Oreg.

[73] Assignee: Bushwacker, Inc., Portland, Oreg.

[21] Appl. No.: 157,872

[22] Filed: Nov. 24, 1993

Related U.S. Application Data

[63] Continuation of Ser. No. 978,830, Nov. 19, 1992, abandoned.

[51] Int. Cl.$^6$ ...................................................... B60J 11/00
[52] U.S. Cl. .......................... 296/136; 280/770; 280/850
[58] Field of Search .................................. 296/136, 191, 296/198; 280/762, 770, 850, 851, 848, 153.5; 293/126, 128

[56] References Cited

U.S. PATENT DOCUMENTS

| | | |
|---|---|---|
| D. 293,311 | 12/1987 | Strosek . |
| D. 294,477 | 3/1988 | Cressoni . |
| D. 307,413 | 4/1990 | Bradley . |
| D. 321,160 | 10/1991 | Kingsley . |
| D. 321,161 | 10/1991 | Ueno . |
| 2,070,230 | 2/1937 | Harroun ................................. 280/848 |
| 2,227,425 | 1/1941 | Cobb . |
| 3,580,628 | 5/1971 | Rantala ............................. 296/191 X |
| 4,115,974 | 9/1978 | Parcell ............................... 296/191 X |
| 4,138,129 | 2/1979 | Morris . |
| 4,164,358 | 8/1979 | Entrup ................................ 296/198 X |
| 4,169,608 | 10/1979 | Logan . |
| 4,378,120 | 3/1983 | Laine . |
| 4,447,067 | 5/1984 | Yamashita . |
| 4,734,312 | 3/1988 | Sugiyama ........................... 296/136 X |
| 4,875,728 | 10/1989 | Copp et al. ............................ 283/126 |
| 5,044,688 | 9/1991 | Jacobson ............................... 296/136 |

FOREIGN PATENT DOCUMENTS

| | | | |
|---|---|---|---|
| 1430800 | 12/1968 | Germany | ............................. 296/198 |
| 3813505 | 11/1989 | Germany | ............................. 296/191 |
| 621392 | 6/1961 | Italy | ...................................... 280/851 |
| 314676 | 12/1989 | Japan | .................................... 296/136 |

*Primary Examiner*—Gary C. Hoge
*Attorney, Agent, or Firm*—Kolisch, Hartwell, Dickinson, McCormack & Heuser

[57] ABSTRACT

A vehicle body extension system is provided for mounting on the fenders and rocker panels of a vehicle. The extensions include fender flare extension units designed to fit each fender. The perimeter of each fender flare unit includes an inner edge which conforms to the shape of the wheel opening and an outer edge which is generally squared-off, with horizontal vertical portions that generally match the shape of the vehicle fender itself. When installed on the vehicle, the fender flare extension units blend with the vehicle's shape and contours to closely resemble custom body work rather than add-on fender flares. Each extension unit has a contoured cross section which includes a protruding region near the wheel opening, a shoulder region, a reverse-turned region and a nonprotuberant border flange region, immediately adjacent the outer edge. Matching molding strips are provided for installation over the rocker panels. A method of installation using adhesives is also described.

12 Claims, 5 Drawing Sheets

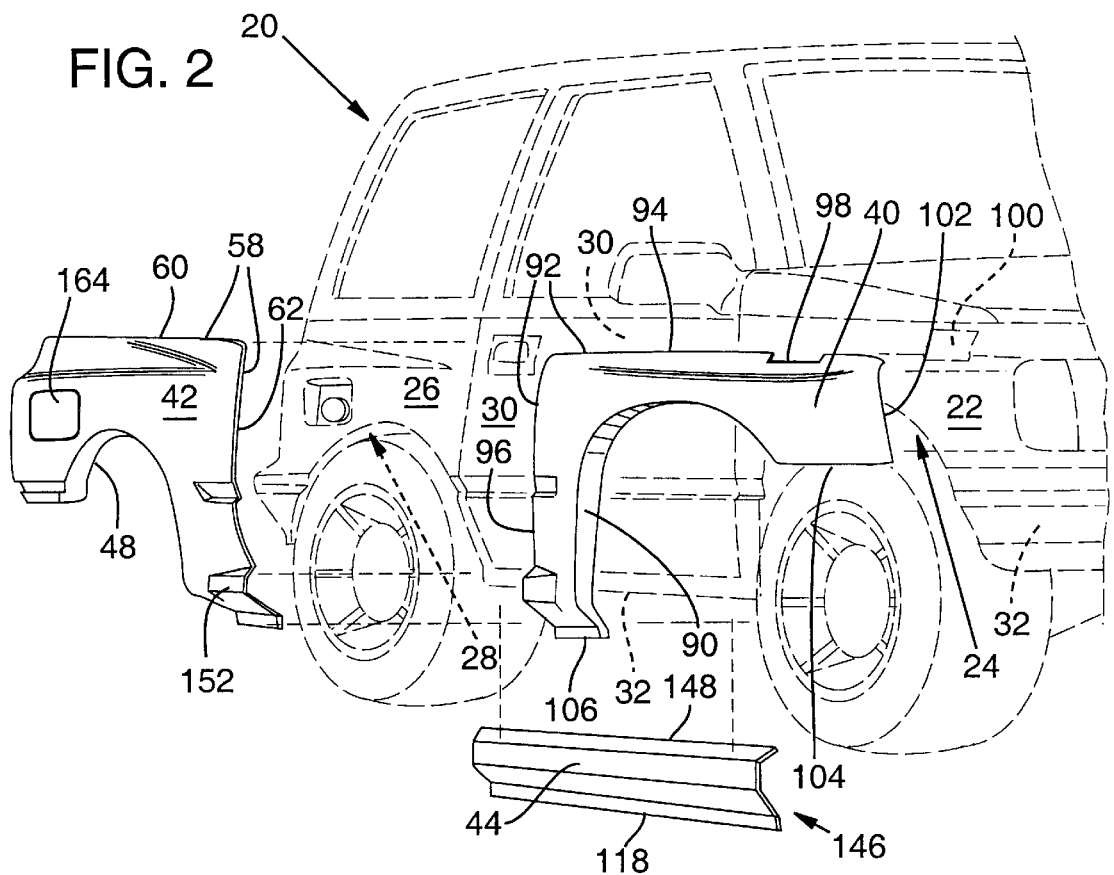
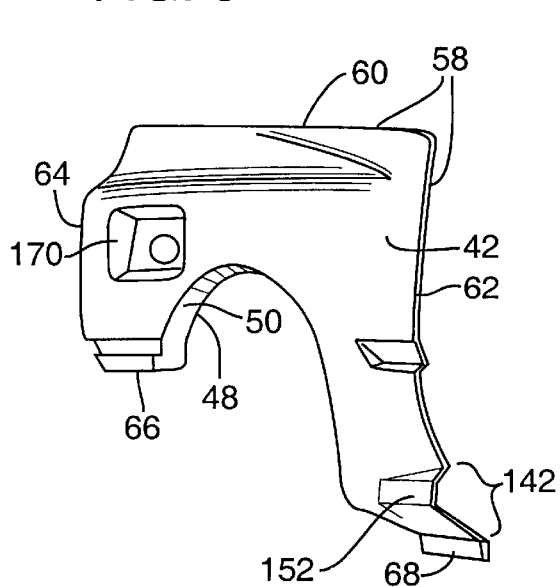
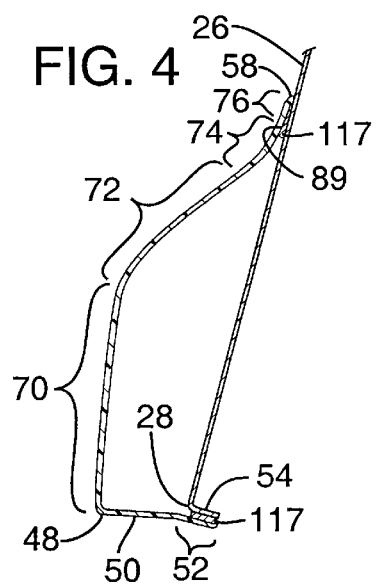

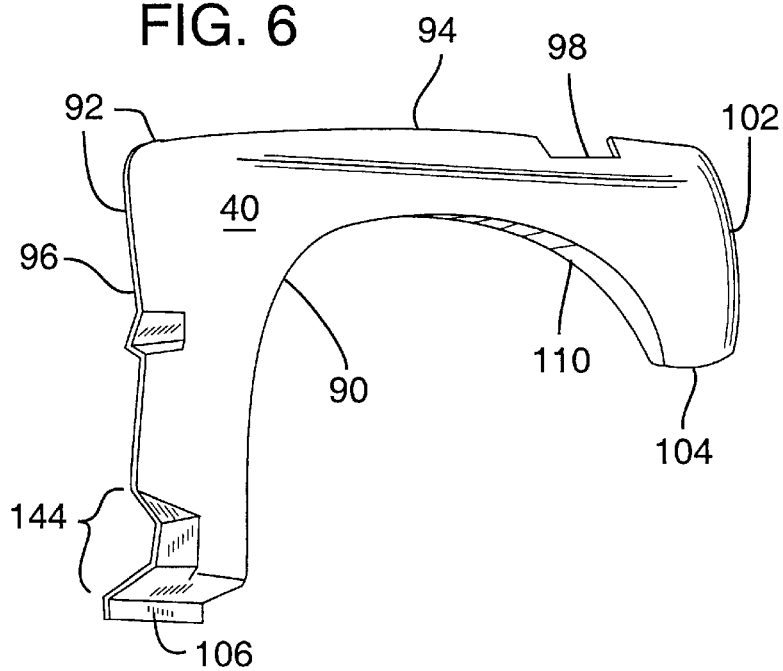
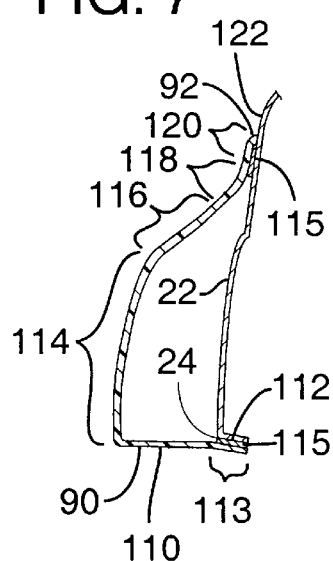
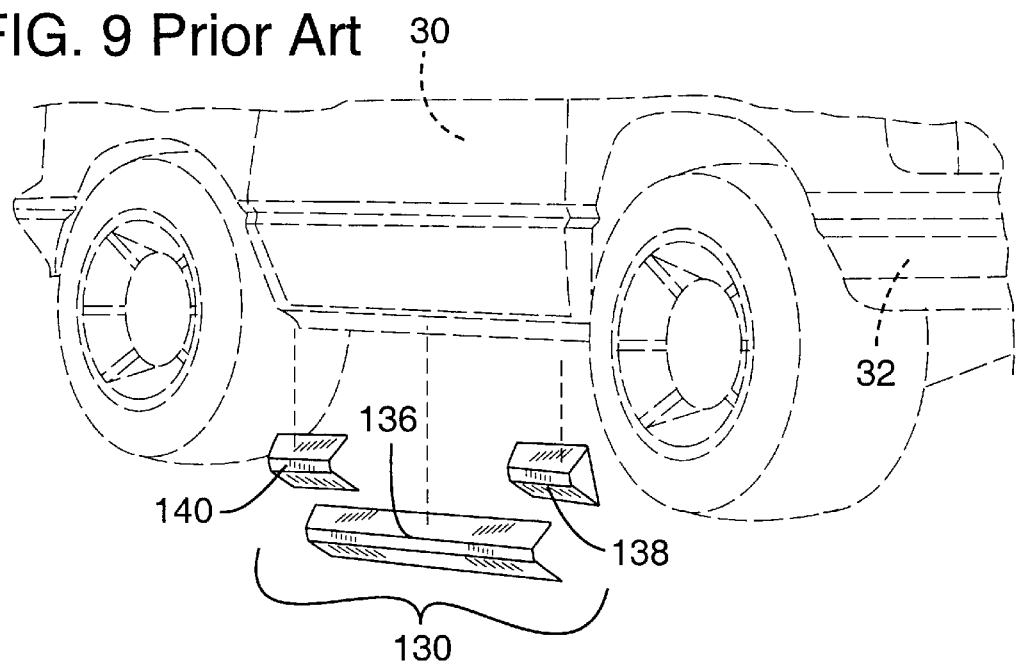

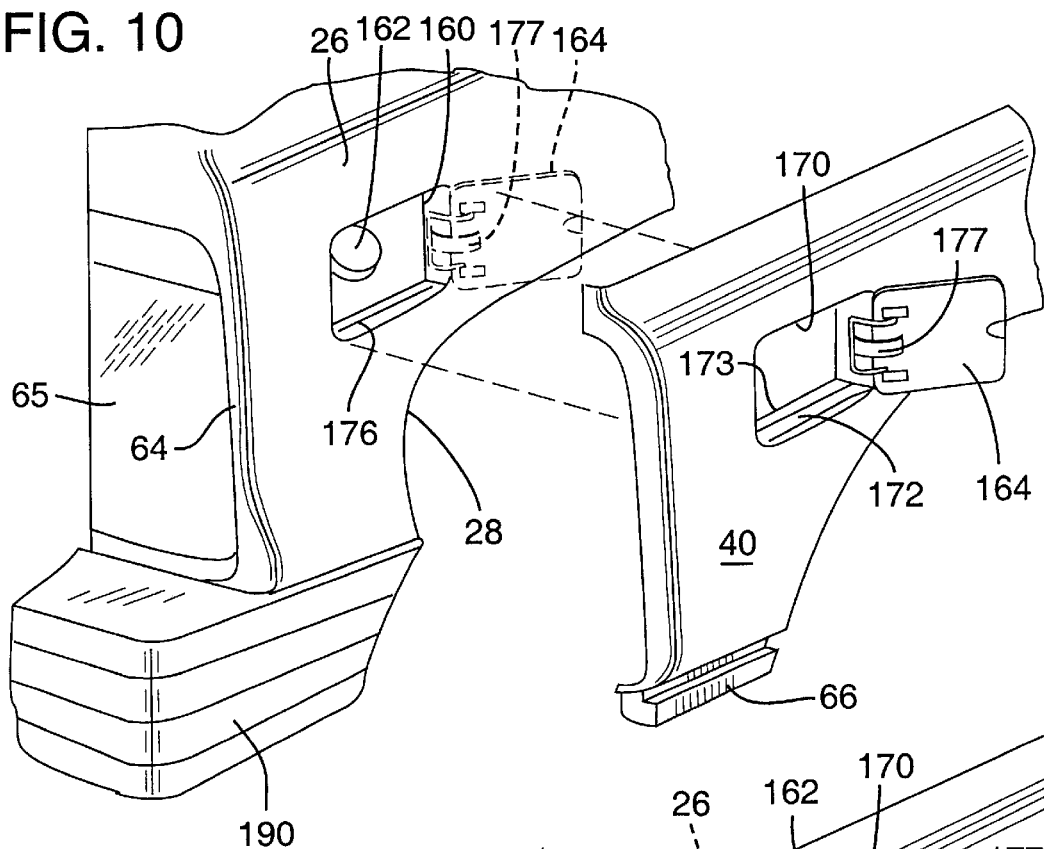
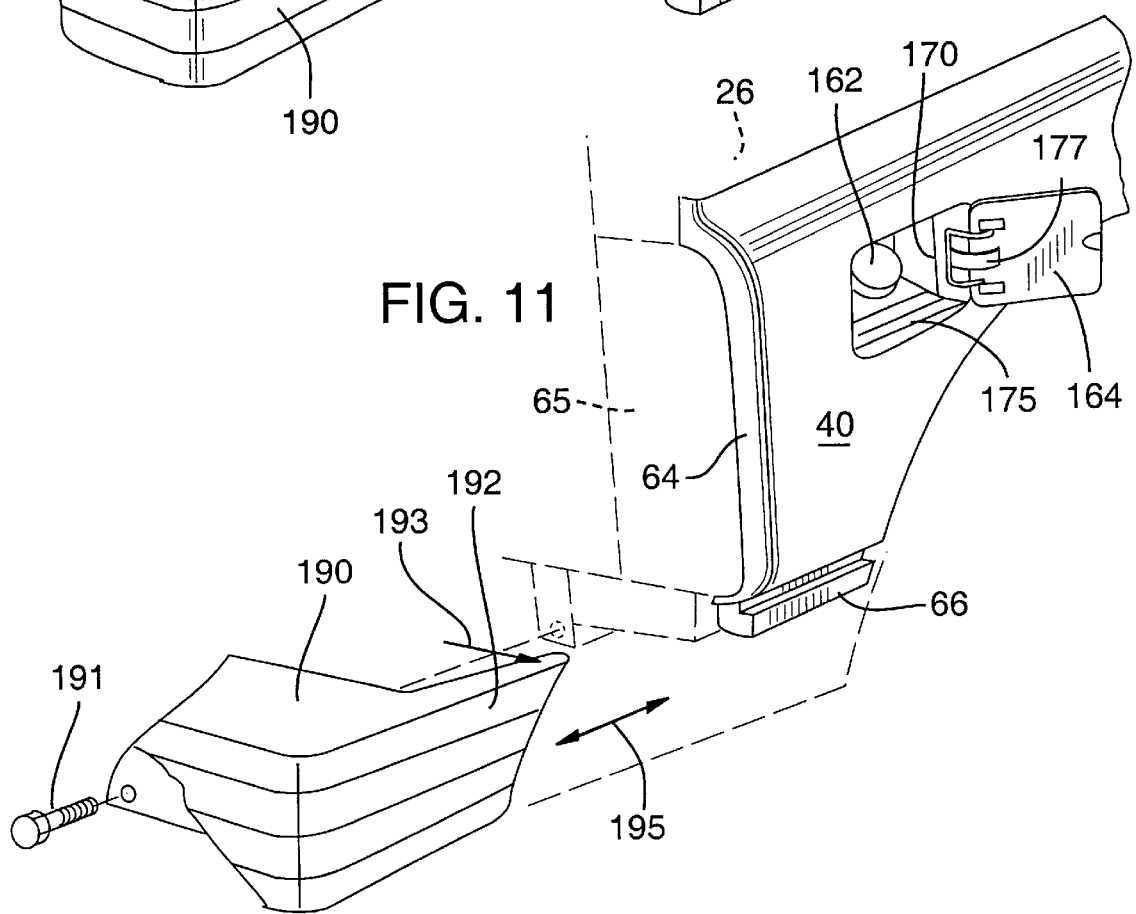

VEHICLE BODY AND FENDER EXTENSION SYSTEM

This is a continuation of application Ser. No. 07/978,830 filed Nov. 19, 1992, now abandoned.

BACKGROUND AND SUMMARY OF THE INVENTION

The invention relates generally to vehicular body extensions such as fender flares and other types of add-on devices which are mounted on a vehicle to change its external dimensions, contours and appearance.

Vehicular body extensions such as fender flares are installed on vehicles to enhance and personalize the appearance of the vehicle. Fender flares can also be used to make a vehicle street legal by extending the fenders outwardly to cover wide or tall tires that extend beyond the normal wheel well openings.

Most fender flares are elongated, molded strips, generally arcuate in shape and made of heavy-gauge plastic. Flares are usually custom-designed to fit a particular brand and model vehicle. The inner arcuate edge of the flare usually matches the shape of the wheel opening of the fender and the outer edge of the flare generally conforms to the shape of the inner edge. As a result, most flares have an elongate, curved shape. When installed on a vehicle, conventional fender flares form a protruding ridge which extends along the edge of the wheel opening.

U.S. Pat. No. 4,169,608 illustrates a fender flare designed for attachment along the inturned flange of a vehicle fender. The flare extends from its line of attachment along the wheel opening flange outwardly away from the fender and curves back over the fender to cover the margin of the wheel opening. At its outer edge, the fender flare in U.S. Pat. No. 4,169,608 meets the exterior surface of the vehicle fender at an abrupt obtuse angle. As a result, the flare has the appearance of a high-relief contoured ridge which stands out from the fender.

It would be desirable to provide a new and original type of vehicular body extension capable of personalizing the appearance of a vehicle by adding outwardly-flaring contours which are different in appearance from prior art fender flares. In particular, it would be desirable to provide vehicle body extensions in the vicinity of the wheel openings which subtly blend with the exterior body panels of the vehicle to simulate custom body work. One feature of prior art fender flares is that they do not transition smoothly to the surrounding vehicular body panels. Instead, they appear as angular ridges added to the vehicle immediately adjacent the wheel openings.

A limitation associated with prior art fender flares is that if the flare is too wide, it will encounter and interfere with auxiliary access doors such as fuel filler openings, which are often in relatively close proximity to the wheel openings. It would be advantageous to have an improved vehicle body extension which can be wide enough to provide a smooth visual transition between the flare and surrounding exterior fender surfaces on which it is mounted without interfering with the operation of access doors such as the fuel filler door.

It would be an additional advantage to provide a vehicular body extension system which incorporates a plurality of fender flare extension units, one for each fender on the vehicle, and which also includes a unifying molding strip for extending between the extension units on each side of the vehicle.

Finally, it would be advantageous to provide a fender flare extension unit which physically and visually joins with a vehicle bumper to provide a smooth transition therebetween.

Accordingly, the present invention provides a vehicle body extension for mounting on an exterior fender surface of a vehicle, in the region surrounding a wheel opening of the vehicle. The extension comprises a fender flare extension unit in the form of a contoured sheet-like body for mounting adjacent a vehicle wheel opening. The extension unit has an inner edge which generally conforms to the shape of the wheel opening and an outer edge which is non-conforming to the shape of the wheel opening and which fits generally conformingly against selected exterior surfaces of a vehicle fender. The contour of the sheet-like body includes a protuberant region adjacent the inner edge, a shoulder region extending from the protuberant region toward the outer edge, a reverse-turned region between the shoulder and selected portions of the outer edge, and a non-protuberant border flange region immediately adjacent the outer edge. Thus configured, the extension unit, when mounted on a vehicle, provides a smooth visual transition between the exterior surfaces of the vehicle fender which are immediately adjacent the outer edge of the extension unit, and the protuberant region immediately adjacent the inner edge.

In its preferred form, a plurality of fender flare extension units are provided, one for each fender. Each unit preferably has rectilinear peripheral edge segments which encompass major portions of the length of the outer edge. The rectilinear segments include a generally straight, horizontal segment encompassing a major portion of the uppermost edge of the unit, and a generally straight vertical segment encompassing a major portion of the part of the outer edge which is closest to a passenger door of the vehicle. The resultant shape provided by the rectilinear segments gives the extension unit a generally squared-off appearance along major portions of its outer edge.

On vehicles which include an access port on the fender through which fuel is supplied to the vehicle, the extension unit for such a fender preferably includes an access opening formed in the sheet-like body of the unit in registration with the fuel filler port to allow access through the extension unit to the port. An exterior access door is mountable on the extension unit to enclose the access opening and cover the fuel filler port.

Finally, in its preferred form, the vehicle body extension includes right-side and left-side molding strips in the form of elongate, rigid members mountable on the vehicle extending along and covering the rocker panels beneath the passenger doors. The molding strips extend between the extension units mounted on the forward and rear fenders on each side of the vehicle.

BRIEF DESCRIPTION OF THE DRAWINGS

FIG. 2 is a partial perspective view as in FIG. 1, partially exploded, showing the right-side front and rear fender flare extension units and the right molding strip removed from the vehicle, and also indicating the respective mounting locations for each part.

FIG. 3 is a perspective view of a right rear fender flare extension unit.

FIG. 4 is a partial cross sectional view of the rear fender flare extension unit and adjacent vehicle fender, taken along line 4—4 of FIG. 1, illustrating the contour of the fender flare extension unit in the region above the wheel opening.

FIG. 6 is a perspective view as in FIG. 3 of the right front fender flare extension unit.

FIG. 7 is a partial cross sectional view of the front fender flare extension unit and adjacent vehicle fender, taken along line 7—7 of FIG. 1, illustrating the contour of the fender flare extension unit in the region above the wheel opening.

FIG. 9 (prior art) is a partial perspective view of the vehicle shown in FIG. 1, partially exploded, illustrating the pre-existing rocker panel sections which must be removed from the vehicle before installation of the body extension molding of the present invention.

FIG. 10 is a partial perspective view, partially exploded, illustrating the installation of the right rear fender flare extension unit of FIGS. 3–5 on the fender of a vehicle, and particularly illustrating how the extension unit allows for access to the fuel filler port on the vehicle through an access opening in the unit.

FIG. 11 is a partial perspective view as in FIG. 10 showing the flare extension unit installed on the vehicle and also showing the cooperation between the extension unit and the vehicle bumper.

DETAILED DESCRIPTION OF THE PREFERRED EMBODIMENT

Figure 1:
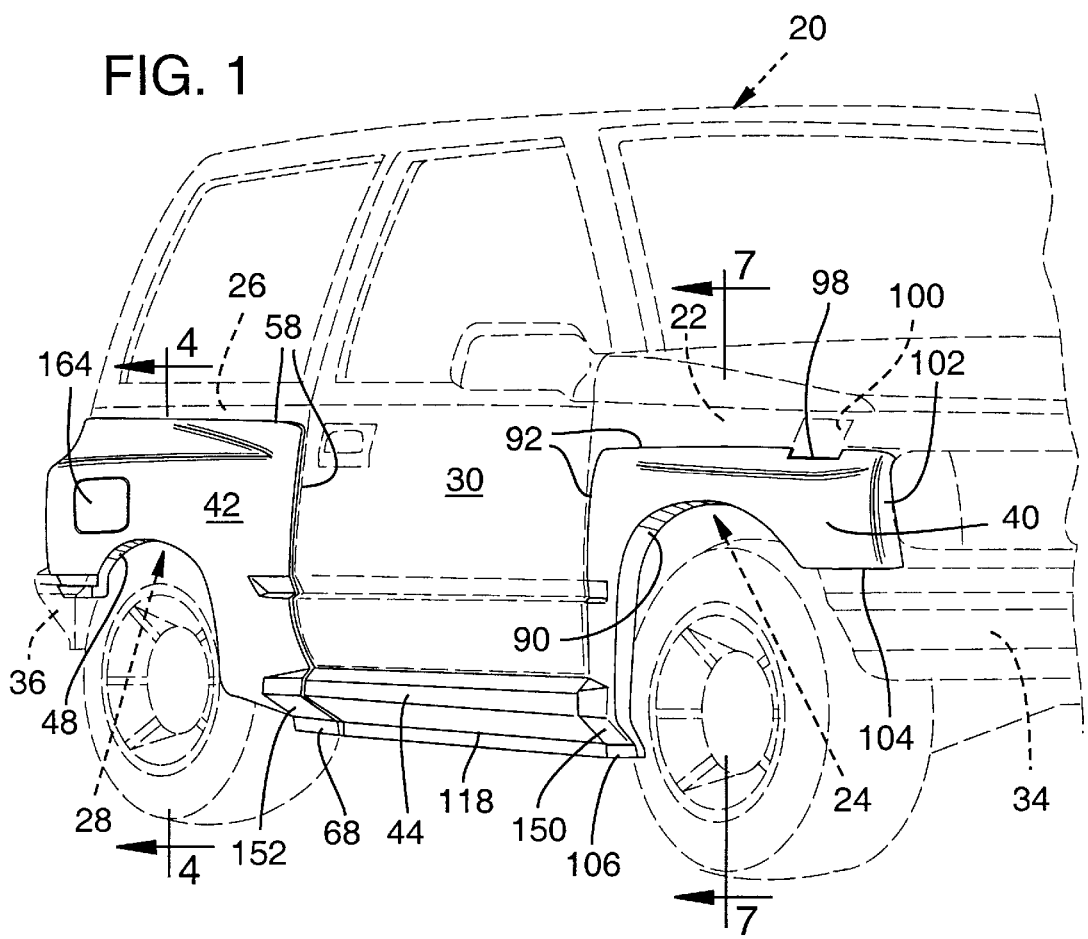
FIG. 1 is a partial perspective view of a vehicle, shown in dashed lines, on which vehicular body extensions of the present invention (shown with solid lines) are installed.
Figure 5:
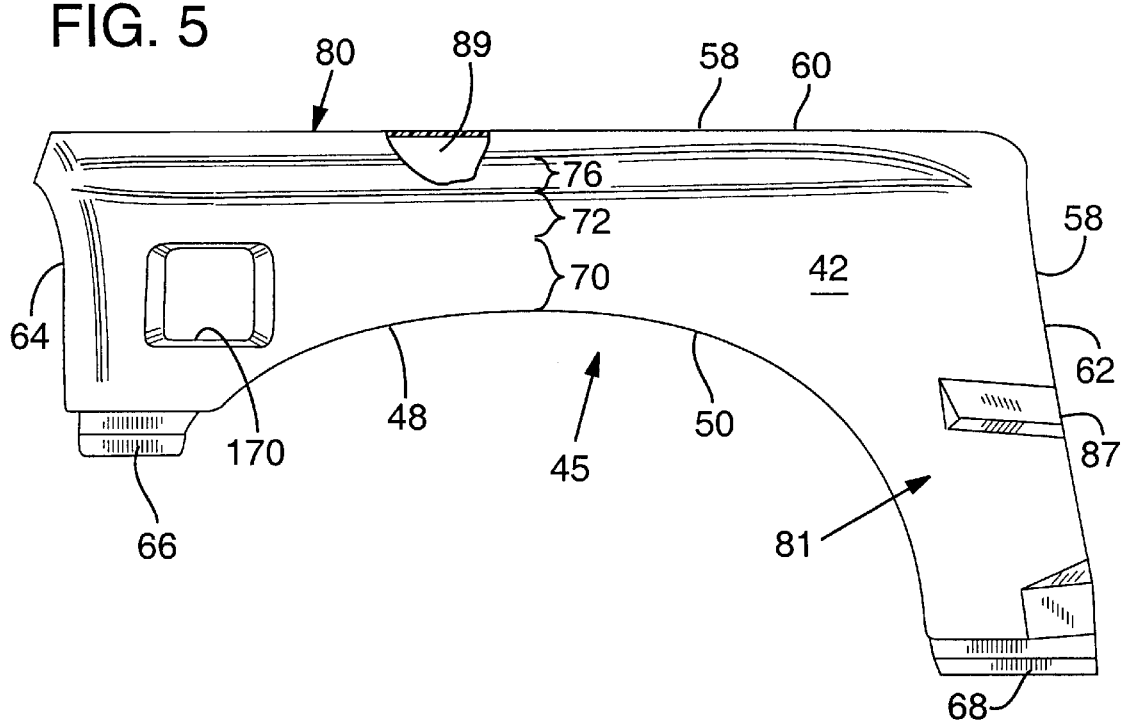
FIG. 5 is a front plan view of the fender flare extension unit of FIG. 3.

FIGS. 1 and 2 show, respectively, a passenger vehicle 20 on which vehicular body extensions in accordance with the present invention are installed, and an exploded view of the extensions off the vehicle. Vehicle 20 includes a forward right side fender 22 which has a wheel opening 24, a rear right side fender 26 which has a wheel opening 28, and respective front and rear left side fenders (not shown) on the opposite side of the vehicle. The left side fenders are substantially mirror images of fenders 22 and 26. Other relevant elements of vehicle 20 referred to in the detailed description below include a passenger door 30 on the right side of the vehicle, a mirror-image passenger door on the left side of the vehicle (not shown), a lower right-side rocker panel 32 (FIG. 2) extending longitudinally along the side of the vehicle between the front and rear fenders, a mirror-image rocker panel on the left side of the vehicle (not shown), a front bumper 34, and a rear bumper 36.

The vehicular body extension of the present invention includes a front right-side fender flare extension unit 40 in the form of a contoured sheet-like body for mounting over the exterior surface of fender 22 in the region surrounding wheel opening 24. The body extension also includes a rear right-side fender flare extension unit 42 in the form of a contoured sheet-like body for mounting on the exterior surface of fender 26 in the region surrounding wheel opening 28. In addition, the body extension includes a right-side molding strip 44 in the form of an elongate generally rigid contoured member which is mountable on and covers the lower rocker panel strip 32. Molding strip 44 extends between front and rear extension units 40, 42, respectively. Substantially mirror-image parts (not shown) are included on the left side of the vehicle.

The extension units and molding strips are preferably vacuum molded from thermoplastic sheet material such as plastic, fiberglass, rubber, vinyl or the like, all of which can be shaped to the specifications of the present invention. The contoured shape of the various parts are created by molding, casting or similar well-known techniques for permanently shaping thermoplastic materials. The preferred method of fabricating the parts of the vehicle body extension is by vacuum molding sheets of plastic. The weight and thickness of the plastic sheet-like material used in the fabrication of the extension units and molding strip is a matter of design choice within the knowledge of those skilled in the art.

In the description below, the relative positions of features and elements on each part is given for the part when installed on the vehicle. For example, terms such as top edge, bottom edge or the edge closest to the passenger door mean the edges located at those positions when the part is installed on the vehicle.

Beginning with right rear extension unit 42 shown in FIGS. 1–5, the peripheral edge of the unit includes an inner edge 48 which is shaped to generally conform to the shape of the left rear wheel opening 28, and an outer edge 58 which is non-conforming to the shape of the wheel opening. Outer edge 58 fits generally conformingly against predetermined exterior surfaces of vehicle fender 26. The overall shape and contour of the peripheral edge of extension unit 42 conforms to the shape of the portions of the vehicle fender which the extension unit contacts, providing a snug fit between the vehicle body and extension.

An inturned lip 50 extends along inner edge 48 of unit 42 (see FIGS. 3 and 4). The inturned lip 50 projects inwardly a short distance into wheel opening 28 and overlaps an inturned flange 54 which extends along the edge of the wheel opening on most vehicles (see FIG. 4). There is a short region of overlap between the innermost portion 52 of lip 50 and wheel opening flange 54 where the lip and flange are secured together by adhesive during installation, as described below.

The outer edge 58 of unit 42 includes a generally straight horizontal segment 60 (see FIG. 5) encompassing a major portion of the uppermost edge of unit 42, and a generally straight vertical segment 62 encompassing a major portion of the forward edge, adjacent the passenger door 30 (when the unit is installed on the vehicle). Segments 60, 62 give the outer edge 58 of fender flare extension unit 42 a rectilinear configuration. Described in another way, horizontal segment 60 and vertical segment 62 are generally perpendicular to one another and produce a generally squared-off appearance along major portions of the outer edge of the extension unit. That squared-off appearance generally matches the appearance of the underlying body panel which forms the exterior portions of fender 26 and is one of the reasons the fender flare extension units of the present invention so nearly resemble custom body work.

Other portions of the perimeter edge of unit 42 include rear edge 64 which, over most of its length, is contoured to extend around the rear corner of fender 26 (shown most clearly in FIGS. 10 and 11), lower rear segment 66 which extends between inner edge 48 and rear edge 64, and a lower forward segment 68 which is configured as a contoured extension of rocker panel molding 44, extending between vertical edge 62 and inner edge 48. Lower edge 66 is in the form of a bracket designed to engage the rear bumper of the vehicle, as will be described below in connection with FIGS. 10 and 11.

The cross sectioned contour or shape of the body of fender flare extension unit 42 (shown in FIG. 4) is designed to extend the vehicle fenders outwardly to cover wide tires and to enhance the vehicle's appearance. The contour includes a protuberant region 70 adjacent inner edge 48, a shoulder region 72 extending from protuberant region 70 toward outer edge 58, a reverse-turned region 74 between the shoulder and selected portions of outer edge 58, and a non-protuberant border flange region 76 immediately adjacent outer edge 58. The resultant shape provides a smooth visual transition between the exterior surfaces of vehicle fender 26, immediately adjacent and outside outer edge 58 and protuberant region 70. In other words, the fender flare extension unit smoothly transitions from the protuberant region 70 down to a thin border flange region 76 without the customary abrupt angular change between the extension and fender found in prior art fender flares. The contours 70, 72, 74 and 76 found in the region above wheel opening 28 can also be provided in the region 81 (FIG. 5) between the wheel opening and vertical edge 62, if desired. In the illustrated embodiment shown in the figures, the contour in the region 81 consists of a gradual taper from the protuberant region 70 down to edge 62.

Figure 8:
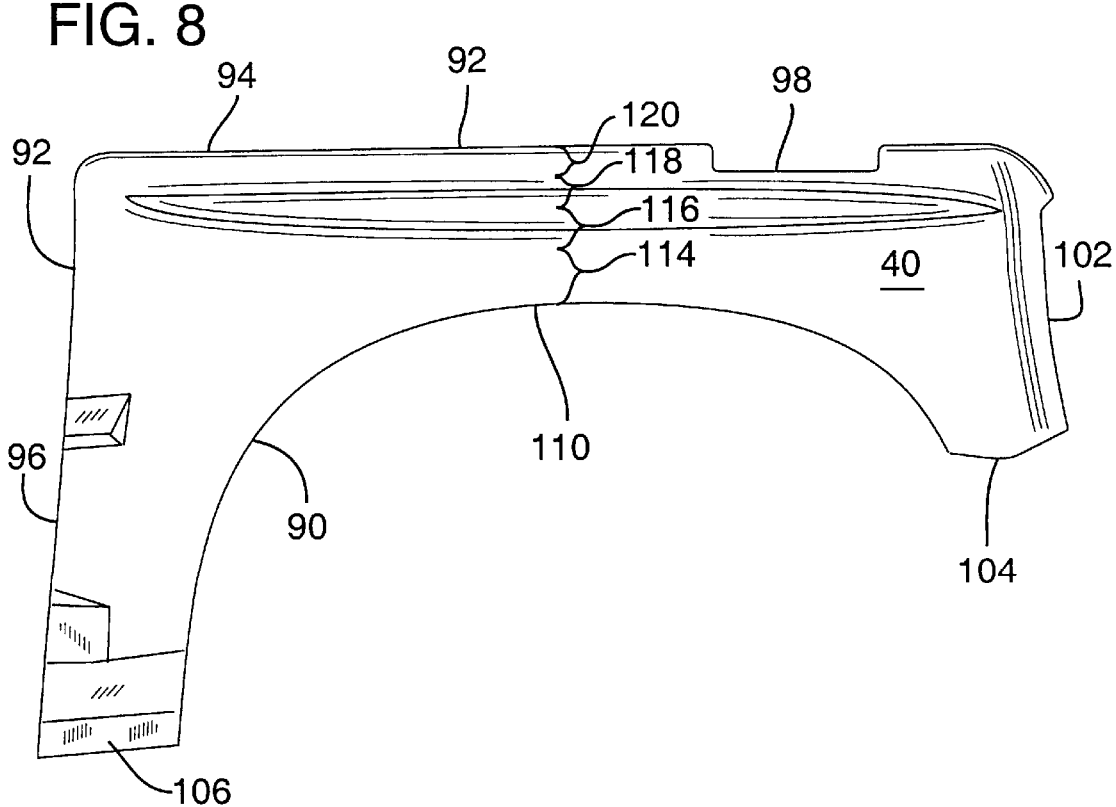
FIG. 8 is a plan view of the fender flare extension unit of FIG. 6.

FIGS. 6, 7 and 8 respectively illustrate right front fender flare extension unit 40 in perspective, cross section and plan view. The peripheral edge of extension unit 40 includes an inner edge 90 which generally conforms to the shape of front wheel opening 24 and an outer edge 92 which is non-conforming to the shape of wheel opening 24. Like rear extension unit 40, the outer edge 92 of extension unit 40 fits generally conformingly against predetermined exterior surfaces of vehicle fender 22 providing a snug fit between the fender and extension. Outer edge 92 includes a top generally horizontal edge segment 94 (see FIG. 8) encompassing a major portion of the uppermost edge of unit 40, and a generally vertical edge segment 96 encompassing a major portion of the rear edge adjacent the passenger door 30 (when installed).

Like extension unit 42, the horizontal and vertical edge segments of unit 40 are generally perpendicular to one another and produce a generally squared-off appearance along major portions of the outer edge of the extension unit. That squared-off appearance generally matches the appearance of the underlying body panel giving the unit the appearance of custom body work. In the illustrated embodiment of the vehicle body extension described herein, which is designed to fit either a Geo Tracker or Suzuki Sidekick, horizontal segment 94 is broken by a short indentation 98 where a reflector or light 100 (see FIG. 1) is positioned on the vehicle fender 22.

The other segments of the perimeter of extension unit 40 include a forward edge 102 which extends along the front corner of fender 22, a forward lower edge 104 which extends along and adjacent front vehicle bumper 34, and lower rear edge 106 which is contoured as an extension of molding strip 44.

An inturned lip 110 extends along inner edge 50 of unit 40 (see FIGS. 6 and 7). The inturned lip 110 projects inwardly a short distance into wheel opening 24 and overlaps an inturned flange 112 which extends along the edge of the wheel opening on most vehicles (see FIG. 7). There is a short region of overlap 113 between the innermost portion of lip 110 and wheel opening flange 112 where the lip and flange are secured together by adhesive during installation, as described below.

The cross sectional contour or shape of the body of fender flare extension unit 40 (shown in FIG. 7) is designed to extend the vehicle fenders outwardly to cover wide tires and to enhance the vehicle's appearance. The contour includes a protuberant region 114 adjacent inner edge 90, a shoulder region 116 extending from protuberant region 114 toward outer edge 92, a reverse-turned region 118 between the shoulder and selected portions of outer edge 92, and a nonprotuberant border flange region 120 immediately adjacent outer edge 92. As with the rear extension unit, the contour of extension unit 40 provides a smooth visual transition between the exterior surfaces of the vehicle fender 122, immediately adjacent outer edge 92, and protuberant region 114.

Because fender flare extension units 40, 42 are substantially broader than conventional fender flares (i.e., they extend over a greater portion of the margins of wheel openings 24, 28), they cover a substantially greater portion of the exterior surface of the vehicle fenders. Consequently, one or another of the extension units can cover the refueling access port on the vehicle. Referring to FIGS. 10 and 11, which are perspective views of the right rear fender of vehicle 20, the fuel filler access port 160 on vehicle 20 is on the right rear vehicle fender 26, near wheel opening 28. Fuel filler port 160 is recessed into the exterior fender surface and is covered by an access door 164. A gas cap 162 allows access to the fuel tank. When door 164 is closed, it is flush with the exterior surface of fender 26. Fender flare extension unit 42 covers fuel filler port 160 when installed on the vehicle. To provide access to the fuel filler port, extension unit 42 includes an access opening 170 formed in the sheet-like material which constitutes the body of the extension unit.

Opening 170 is located so that it will be in positional registration with the fuel filler access port 160 and is preferably countersunk, with an encircling inturned lip 172 around the opening. Lip 172 extends inwardly a distance sufficient to place the inset edge 173 of opening 170 directly over the fuel filler opening 160. Lip 172 encloses the peripheral space which would otherwise exist between exterior fender surface 26 and the surface of extension unit 42, preventing objects from being dropped into the space between the fender and the extension unit. The outer peripheral edge 175 of opening 170 includes a recessed step 175 which matches the recessed step on peripheral edge 176 on the fuel filler access port opening 160. As part of the installation process, access door 164 and the hinge 177 and other door-supporting hardware is removed from opening 160 on the vehicle and transferred to opening 170 on extension unit 40. Once installed on the extension unit, door 164 operates in exactly the same manner as when it was installed on the vehicle fender.

Installation of the fender flare units of the vehicular body extension of the present invention will now be described. Prior to installation of any of the parts of the vehicular body extension, several preparatory steps are required. The stock or pre-existing rocker panel cover 130 must be removed from the vehicle, as shown in FIG. 9. On the Geo Tracker and Suzuki Sidekick the pre-existing stock rocker panel 130 comes in three segments, a long center segment 136 and forward and rear end segments 138, 140, respectively. The rocker panel segments are fastened by mounting screws (not shown) which are removed, together with any mounting brackets (not shown). Another preparatory step is to remove any pre-existing accent strips or fender flares mounted on any wheel openings of the vehicle. The gas tank filler door 164 and its hinge and mounting bracket 177 are removed from fender 26. Referring to FIG. 11, the mounting screws 191 which retain rear bumper 190 on the vehicle are removed and the bumper is slid rearwardly off the vehicle in the direction of arrows 195. Any bumper-supporting hardware is also removed. In particular, any slide brackets (not shown) on the back side of the wrap-around lip 192 on bumper 190 are removed.

The preferred method and means for installing the fender flare extension units 40, 42 and molding strip 44 on vehicle 20 is by means of adhesive. Consequently, the person installing the body extensions will preferably perform the additional preparatory step of roughening or sanding the back side (i.e., the side which faces toward the vehicle) of each extension unit along the margin of the perimeter, to improve adhesion. Finally, the exterior surface areas of the vehicle where adhesive will be applied should be thoroughly cleaned, preferably with isopropyl (rubbing) alcohol and a clean cloth.

Following those preparatory steps, the installation of the fender flare extension units and molding strip can proceed. Turning first to rear fender flare extension unit 42, a bead or strip 117 of metal/plastic bonding adhesive, such as urethane sealant, is applied in the overlap region 52 of lip 50 on the inner edge 48 of the wheel arch area (see FIG. 4). Urethane adhesive 117 is preferably a caulking or bonding compound such as Bostik® 1000 FS Urethane Sealant. In the wheel arch area along inner edge 48 and other parts of the periphery of unit 42, the adhesive is preferably applied first to the back side of the extension unit in a ¼-inch wide by ⅛-inch thick bead. Sealant is applied approximately ⅛-inch to 3/16-inch inwardly from the edge to allow for "squeeze out." An advantage of having a generally non-protuberant border flange region 76 along the top outer edge 60 is that it provides a relatively wide surface on which to apply adhesive for securing the extension unit to the vehicle fender. Adhesive along top edge 58 is indicated at 117 in FIG. 4. Once the adhesive is applied around the periphery of unit 42, it is pressed into place on fender 26, at which time the edge should be taped and the wheel arch area along inner edge 48 should be clamped to hold the unit in its correct position until the sealant cures. Should adhesive squeeze out from behind the extension unit onto visible surfaces on the fender, the excess adhesive should be immediately wiped off. Once the adhesive has set, the filler door 164 and hinge mounting bracket and hardware 177 (previously removed from fender 26) is installed adjacent the fuel filler access opening 170. Finally, rear bumper 190 is installed on vehicle 20 by sliding it in the direction of the right half of arrow 195 in FIG. 11. The wrap-around lip 192 on bumper 190 is pulled outwardly in the direction of arrow 193 in order for the lip to clear the lower edge bracket 66 on unit 40. Bumper 190 is made of heavy-gauge plastic permitting wrap-around lip 192 to be flexed. Bracket 66 holds the bumper lip 192 in place and assures a smooth visual transition between the bumper and extension unit.

The installation steps for right front fender flare extension unit 40 on front fender 22 are essentially the same as for unit 42, except that there is no fuel filler door or bumper to install. A perimeter bead of adhesive 115 is applied around the peripheral edge of unit 40, including along the overlap region 113 of inturned lip 110 on inner edge 90. The unit is pressed tightly against the fender and taped, clamped or otherwise secured to the fender until the adhesive has cured.

The rocker panel cover molding strip 44 is installed after the front and rear extension units 40, 42, respectively, have been installed on the vehicle. A bead of adhesive sealant is applied to the back side of the lower flange 118 (see FIGS. 1 and 2) of molding strip 44 and another bead can be applied to the back side of upper edge 148, if desired. The molding strip is then pressed into place in alignment with the lower right corner region 142 of rear extension unit 42 and with the lower rear edge region 144 of unit 140 (see FIGS. 1, 3 and 6). The contour of the lower forward corner 142 of unit 42 and the lower rear corner 144 of unit 40 match the shape of molding strip 44 along their respective edges. Consequently, when the molding strip is installed on the vehicle, the result is a unified appearance, with the molding strip extending between the units.

Installation of the left-side fender flare extension units and molding strip (not shown) is exactly the same as for the right side units and molding strip described above, except that the fuel filler opening 170 will be absent from the rear unit. Once all four extension units and the right- and left-side molding strips are in place on the vehicle, installation is complete. The result is a vehicle body extension system which provides a plurality of fender flare extension units, one for each wheel opening on the vehicle, and further includes left-side and right-side molding strips which extend between the units on each side of the vehicle. Wherever necessary or desirable, the installer can employ fasteners to additionally secure the body extension parts to the vehicle. In general, adhesives have been found to be sufficiently secure for most vehicle installations.

The vehicular body extension of the present invention provides a unique concept in fender flares which results in a customized appearance similar to costly custom body work. Unlike conventional fender flares, which are generally long curved strips of molded material having generally parallel inner and outer edges, the fender flare extension units of the present invention extend over a broad expanse of the vehicle fender. The extension units are like add-on fenders which cover and extend outwardly from the original fenders. The contour of each extension unit includes a non-protuberant border flange region along selected portions of the rectilinear outer edge to provide a smooth visual transition between the extension unit and the underlying vehicle fender. That produces an appearance similar to custom body work. The border flange region also serves as a location for applying adhesive to secure the extension unit to the vehicle fender. The result is a secure add-on fender flare extension without the "add-on" appearance of conventional fender flares.

Alternative embodiments are possible within the scope of the present invention. For example, it will be understood by those skilled in the art that the exact shape and contour of the illustrated fender flare extension units is suggestive only and that vehicular body extensions of the type shown are generally shaped and designed to fit specific vehicle models and types. For example, the shapes of the wheel openings, the outer edge, and other portions of the extension unit perimeter shown in the figures are tailored to the shapes of the exterior body panels found on Geo Trackers and Suzuki Sidekicks. Vehicular body extensions of the present invention designed for other vehicle models and types will differ somewhat in appearance from the shapes and contours shown in the figures herein. Such variations are within the scope of the present invention.

It should also be understood that the use of a connecting molding strip covering the vehicle rocker panel is optional and could be omitted from the body extension system described herein. The use of four fender flare extension units, one on each fender of the vehicle, is also optional and configurations of the present invention incorporating only front or rear fender flare extension units, but not both, would be possible. For example, on vehicles where the owner desires to install large size rear tires for additional traction, only rear fender flare extension units may be necessary in order to make the vehicle street legal. These and other variations are possible within the scope of the present invention.

While the present invention has been shown and described with reference to the foregoing preferred embodiment, it should be understood that other changes in form and detail may be made without departing from the scope and spirit of the invention as defined in the appended claims.

What is claimed is:

1. A vehicle body extension for mounting on an exterior fender surface of a vehicle in the region surrounding a wheel opening of the vehicle, the extension comprising:

a fender flare extension unit in the form of a contoured sheet-like body for mounting adjacent a vehicle wheel opening, the unit having an inner edge which generally conforms to the shape of the wheel opening and an outer edge which is nonconforming to the shape of the wheel opening and which fits generally conformingly against predetermined exterior surfaces of a vehicle fender, the contour of the sheet-like body being exposed, when mounted on a vehicle, to reveal a protuberant region adjacent the inner edge, a shoulder region extending from the protuberant region toward the outer edge, a reverse-turned region between the shoulder and selected portions of the outer edge, and a nonprotuberant border flange region which extends substantially parallel with the vehicle body and terminates immediately adjacent the outer edge of the unit, whereby the extension unit provides a smooth visual transition between the exterior surfaces of the vehicle fender which are immediately adjacent the outer edge, and the protuberant region.

2. A vehicle body extension as in claim 1 in which the outer edge of the extension unit includes rectilinear segments encompassing major portions of the length of the outer edge.

3. A vehicle body extension as in claim 1 for use on a vehicle having at least one passenger door on each side of the vehicle, in which, when the extension unit is in place on a vehicle, the outer edge includes a generally straight horizontal segment encompassing a major portion of the uppermost edge of the unit, and includes a generally straight vertical segment encompassing a major portion of the part of the outer edge which is closest to a passenger door of the vehicle.

4. A vehicle body extension as in claim 3 in which the horizontal and vertical segments of the outer edge are generally perpendicular to one another giving the extension unit a generally squared-off appearance along major portions of the outer edge.

5. A vehicle body extension as in claim 1 in which the vehicle has an access port in the exterior fender surface area through which fuel is supplied to the vehicle, and the extension unit extends over the access port when in place on the vehicle, the unit further including an access opening formed in the sheet-like body, and the access opening being in registration with the access port on the vehicle whereby the port is accessible through the access opening.

6. A vehicle body extension as in claim 1 in which the fender flare extension unit is adapted for mounting adjacent a rear wheel opening of the vehicle and fits against exterior surfaces of a rear vehicle fender, the vehicle further including a rear bumper extending laterally across the rear end of the vehicle, the bumper also including a forward-extending portion at each end in the form of a lip which extends along the side of the vehicle, each extension unit adapted for installation adjacent a rear wheel opening further including a lower rear edge in the form of a bracket for fitting behind and cooperatively engaging the forward extending lip of the vehicle bumper, whereby the extension unit and bumper cooperatively engage one another to provide a smooth visual transition between the extension unit and the bumper.

7. A vehicle body extension as in claim 1 for use on a vehicle having front and rear exterior fender surfaces in the respective regions surrounding the front and rear wheel openings on each side of the vehicle, the vehicle body extension including a plurality of the extension units, one for each wheel opening on the vehicle, and further including a left-side molding strip in the form of an elongate generally rigid member which is mountable on the vehicle and which, when in place on the vehicle, extends between the units on the left side of the vehicle, and a right-side molding strip in the form of an elongate generally rigid member which is mountable on the vehicle and which, when in place on the vehicle, extends between the units on the right side of the vehicle.

8. A vehicle body extension as in claim 7 for use on a vehicle which has a lower strip of the vehicle body extending longitudinally along each side of the vehicle between the exterior fender surfaces surrounding the front and rear wheel openings, and the right- and left-side molding strips are positioned over the lower strips of the vehicle body on the right and left sides of the vehicle, respectively.

9. A vehicle body extension as in claim 1 in which the extension unit is secured to the vehicle fender via an adhesive which is applied to the extension unit's back side.

10. A vehicle body extension for mounting on an exterior fender surface of a vehicle in a region surrounding a wheel opening of the vehicle and having a fuel filler door covering an access port through which fuel is supplied to the vehicle, the extension comprising:

a fender flare extension unit in the form of a contoured sheet-like body for mounting adjacent a vehicle wheel opening and extending over the vehicle's access port, the unit having an inner edge which generally conforms to the shape of the wheel opening and an outer edge which is nonconforming to the shape of the wheel opening and which fits generally conformingly against predetermined exterior surfaces of a vehicle fender, the contour of the sheet-like body including a protuberant region adjacent the inner edge, a shoulder region extending from the protuberant region toward the outer edge, a reverse-turned region between the shoulder and selected portions of the outer edge, and a nonprotuberant border flange region immediately adjacent the outer edge, whereby the extension unit, when mounted on a vehicle, provides a smooth visual transition between the exterior surfaces of the vehicle fender which are immediately adjacent the outer edge, and the protuberant region;

the unit including an access opening formed in the sheet-like body, and the access opening being in registration with the access port whereby the port is accessible through the access opening;

the extension unit further including an outside access door operatively mounted thereon for covering the access opening, whereby the access door on the unit permits use of the access port on the vehicle through the access door and opening.

11. A vehicular body extension as in claim 10 in which the fuel filler door which covers the access port on the exterior fender surface of the vehicle is removed prior to installation of the extension unit on the fender, and the outside access door operatively mounted on the extension unit is the same as the fuel filler door on the fender.

12. A vehicle body extension for mounting on an exterior fender surface of a vehicle in the region surrounding a wheel opening of the vehicle, the extension comprising:

a contoured sheet-like body for mounting adjacent a vehicle wheel opening, the body having an inner edge which generally conforms to the shape of the wheel opening, an outer edge which is nonconforming to the shape of the wheel opening and which fits against predetermined exterior surfaces of the vehicle fender, and an exterior surface which extends therebetween, the exterior surface of the body including a protuberant region adjacent the inner edge, a shoulder region extending from the protuberant region toward the outer edge, a reverse-turned region between the shoulder and selected portions of the outer edge, and a nonprotuberant border flange region which extends substantially parallel with the vehicle body and which terminates at the unit's outer edge, each of such regions remaining exposed when the body is mounted to the vehicle, whereby the body provides a smooth visual transition between the exterior surfaces of the vehicle fender, the nonprotuberant border flange, and the protuberant region; and an adhesive applied to the body's back side to secure the body to the vehicle without obstructing view of the nonprotuberant border flange region.

* * * * *